United States Patent

Scott et al.

[15] 3,638,026

[45] Jan. 25, 1972

[54] MULTICOLOR PHOTOVOLTAIC DEVICE

[72] Inventors: Myrsyl W. Scott; Ernest L. Stelzer, both of Minnetonka, Minn.

[73] Assignee: Honeywell Inc., Minneapolis, Minn.

[22] Filed: June 29, 1970

[21] Appl. No. 50,484

[52] U.S. Cl. ........................................250/211 J, 317/235 N

[51] Int. Cl. ........................................H01j 39/12

[58] Field of Search ......................250/211, 220; 317/235 N; 313/108 D; 136/89; 148/33.5

[56] References Cited

UNITED STATES PATENTS

| | | | |
|---|---|---|---|
| 3,496,024 | 2/1970 | Ruehrwein | 317/235 N |
| 3,413,507 | 11/1968 | Itoh | 317/235 N |
| 3,458,779 | 7/1969 | Blank | 317/235 N |
| 2,965,867 | 12/1960 | Greig | 250/211 |

*Primary Examiner*—James W. Lawrence
*Assistant Examiner*—D. C. Nelms
*Attorney*—Lamont B. Koontz and Omund R. Dahle

[57] ABSTRACT

A photovoltaic device having peak response at several different wavelengths is formed by a body of a semiconductor alloy material having a compositional gradient and containing diffused PN-junctions in regions of different composition, the energy gap of the material being dependent upon the composition of the alloy.

12 Claims, 5 Drawing Figures

PATENTED JAN 25 1972 3,638,026

INVENTORS
MYRSYL W. SCOTT
ERNEST L. STELZER
BY
Omund R. Dahle
ATTORNEY.

MULTICOLOR PHOTOVOLTAIC DEVICE

BACKGROUND OF THE INVENTION

The temperature of a body can be determined by a device known as a radiometer, which measures the intensity of electromagnetic radiation emitted from that body. In order to use a radiometer which detects just one wavelength of radiation, it is necessary to know both emissivity of the source, and the transmission of the space between the source and the detector. A radiometer which detects two wavelengths from the same source and measures the ratio of the intensity of the two wavelengths can make temperature measurement independent of the emissivity of the source and transmission of the intervening space. Such a two-color radiometer was proposed in 1921 by H. W. Russell et. al., in *Temperature, It's Measurement and Control in Science and Industry*, Page 1159. In a two-color radiometer, it is desirable to have the individual detectors very close to one another since this allows the detectors to use a single beam of radiation, thereby reducing any differences in the radiation received by the two detectors, and eliminating the additional optics required to direct two identical beams to the detectors.

The conductivity of a semiconductor is proportional to the concentration of charge carriers present. When radiation falls on a semiconductor, photons having an energy greater than the energy gap of the semiconductor will break covalent bonds and produce hole-electron pairs in excess of those generated thermally, causing an increase in the conductivity of the material. The creation of the hole-electron pair is called intrinsic excitation, while the excitation of a donor electron into the conduction band or a valence electron into acceptor state is called an extrinsic or impurity excitation. For a lightly doped semiconductor, the density of states in the conduction and valence bands greatly exceeds the density of impurity states, and photoconductivity is due principally to intrinsic excitation. Such a semiconductor is termed an intrinsic photoconductor. Since the minimum energy of a photon required for intrinsic excitation is the energy gap, $E_g$, of the intrinsic photoconductor, it can be seen that the wavelength at which peak response is obtained is dependent upon $E_g$.

In prior art two-color detectors, slices of two different semiconductor materials having different energy gaps and therefore different peak response wavelengths are laminated together in a piggy back fashion, FIG. 1. They can be mounted to one another by a transparent glue, or one semiconductor can be epitaxially grown on the surface of the other. Since one detector is mounted on top of the other, a single beam of radiation is used. The signals from the two detectors are then electrically compared so that a ratio, the intensity of the two wavelengths, is obtained.

If the semiconductor detector having the larger energy gap is mounted on top, it absorbs the shorter wavelength, higher energy radiation while transmitting to the detector below the longer wavelength, lower energy radiation. In this manner, the device is self-filtering since the longer wavelength detector is not subjected to the higher energy radiation.

One disadvantage of such a detector system is that two different materials have to be produced in order to make a single device. A further disadvantage is that energy is lost at the interface between the different materials.

SUMMARY OF THE PRESENT INVENTION

A photovoltaic detector consists of a semiconductor material containing a PN-junction. At equilibrium, the Fermi level, $E_f$, must be constant. Since the Fermi level of N-type semiconductor is closer to the conduction band while that of the P-type semiconductor is closer to the valence band, a potential barrier is created. If radiation having the proper energy for intrinsic excitation falls on the surface of the PN-junction, hole-electron pairs are created. The minority carriers cross the barrier and the minority current increases. Since the total current remains zero, majority current increases the same amount as the minority current. This rise in the majority current is accomplished by a reduction in the potential barrier height, and the voltage across the diode terminals is just equal to the amount by which the potential barrier is decreased. The wavelength at which peak response occurs for the photovoltaic effect is determined by the energy gap of the semiconductor material.

A semiconductor alloy material is an alloy of two semiconductors or a semiconductor and a semimetal exhibiting semiconductor properties. The composition of the alloy determines the energy gap and therefore the optical and semiconducting properties of the material. A body of semiconductor alloy material can be produced having a composition which is different at various locations through the body.

In the present invention a multicolor photovoltaic device is formed from a single body of a semiconductor alloy material having differences in composition throughout the body. Diffused regions form PN-junctions within the body at locations of different composition. Since the energy gap and therefore the peak response wavelength of the material at any location is dependent upon the composition of the material at that location, the various PN-junctions each exhibit a peak photovoltaic response at a different wavelength. Therefore, the multicolor photovoltaic device of the present invention comprises an array of individual photovoltaic detectors incorporated in a single body of semiconductor alloy material.

DESCRIPTION OF THE PREFERRED EMBODIMENTS

Figure 2:
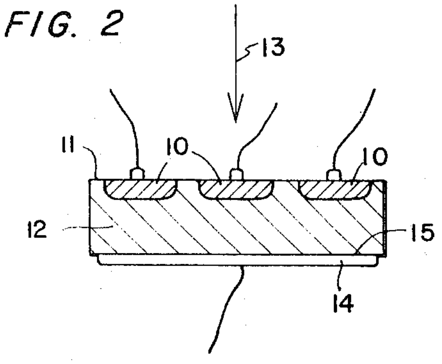
FIG. 2 shows a first embodiment of a multicolor photovoltaic device formed in a single body of semiconductor alloy material as described in the present invention.

In a first embodiment of the present invention, FIG. 2, diffused regions 10 forming PN-junctions are located in one surface 11 of a slice of semiconductor alloy material 12, and the radiation 13 is incident upon that surface. A compositional gradient runs parallel to the incident surface of the device so that each PN-junction is at a location at which the alloy has a different composition. A common contact 14 is provided on the surface 15 opposite the incident surface 11. Three-diffused regions 10 have been shown for illustrative purposes, but the invention is in no way limited to that number of diffused regions.

Figure 3:
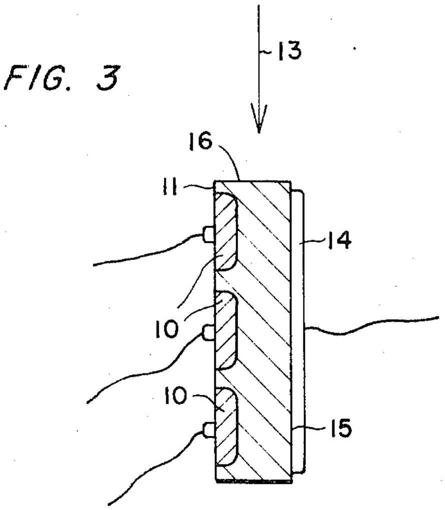
FIG. 3 shows another embodiment of the present invention wherein the device is self-filtering.

Referring to FIG. 3, a second embodiment of the present invention is shown. The surface 16 upon which the radiation is incident is essentially normal to the surface 11 in which the PN-junctions are formed. A common contact 14 is provided on the surface 15 opposite the PN-junctions. If the composition varies so that mole ratio $x$ of the larger energy gap constituent in the alloy increases as the incident surface is approached, the first detector has the largest energy gap, and each succeeding detector has a smaller energy gap. In this way, the shorter wavelength and therefore higher energy radiation is absorbed in the top detectors, while the longer wavelength, lower energy radiation is transmitted through the device to the lower detectors. In this manner, the device is self-filtering.

Figure 1:
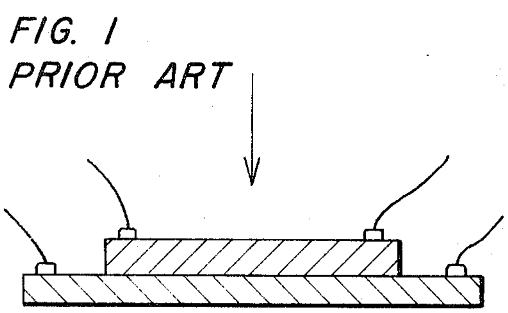
FIG. 1 PRIOR ART
FIG. 1 shows a prior art laminated two-color photodetector.
Figure 4:
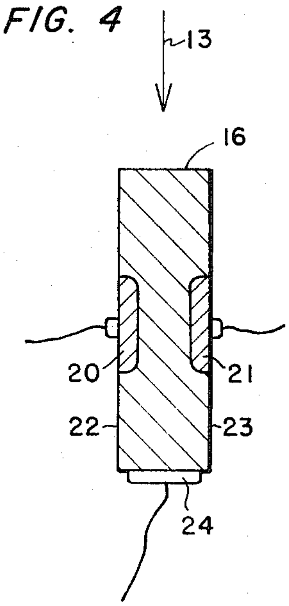
FIG. 4 shows another embodiment of the present invention wherein PN-junctions are located on opposite surfaces to form a two-color photovoltaic device.

In another embodiment, FIG. 4, diffused regions 20 and 21 are located in surfaces 22 and 23 which are opposite one another. The radiation 13 is incident upon a surface 16 which is normal to surfaces 22 and 23, and a common contact 24 is located at still another surface which is normal to the surfaces containing the PN-junctions. As can be seen, the depth of diffusion of the diffused regions 20 and 21 must be controlled to insure that the regions do not make contact with one another.

Figure 5:
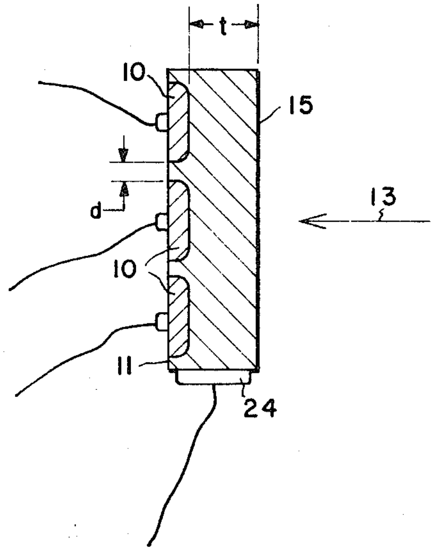
FIG. 5 shows another embodiment of the self-filtering multicolor photovoltaic device described in the present invention.

Referring to FIG. 5, another embodiment of the invention, in which the radiation 13 is incident to a surface 15 opposite that in which the diffused regions 10 are located is shown. A common contact 24 is provided at one end of the device. If the distance, *t*, from the incident surface to the junction, and the spacing, *d*, between the junctions are both greater than the minority carrier diffusion length, the device is self-filtering. This self-filtering action produces a multicolor array of narrow band detectors.

Mercury cadmium telluride ($Hg_{1-x}Cd_xTe$) is a semiconductor alloy consisting of a semimetal, mercury telluride, and a semiconductor, cadmium telluride. The mole ratio, *x*, of cadmium telluride in the alloy determines the energy gap and therefore the peak response wavelength of the alloy. $Hg_{1-x}Cd_xTe$ has been found to have the proper energy gap for intrinsic photoconductivity in the infrared range, with the peak response wavelength depending upon the composition of the alloy. Therefore $Hg_{1-x}Cd_xTe$ is a suitable semiconductor alloy material for use in the multicolor detectors of the present invention.

In one method for fabricating a $Hg_{1-x}Cd_xTe$ multicolor detector, an ingot of $Hg_{1-x}Cd_xTe$ containing compositional gradients is grown by the modified Bridgman method described by E. L. Stelzer et al., in the *IEEE Transactions on Electron Devices*, Pages 880–884, Oct., 1969. From the ingot a slice of $Hg_{1-x}Cd_xTe$ is obtained. The slice is then checked with an electron beam microprobe to obtain a profile of the composition of the slice. Using this information, diffused regions are made such that each PN-junction is located in a region having the proper composition to produce a peak response at one of the desired wavelengths. A typical multicolor photovoltaic device of the present invention has dimensions of a few millimeters on a side. Other methods for producing a body of $Hg_{1-x}Cd_xTe$ which contains a compositional gradient are possible, such as epitaxial growth, vapor transport, and interdiffusion of HgTe into CdTe.

The energy gap of $Hg_{1-x}Cd_xTe$ is dependent upon temperature as well as composition, and the amount of temperature dependence of the energy gap depends upon the composition of the material. It is possible to adjust the response of the device shown in the present invention by varying the temperature of the device, since each individual detector has a different temperature dependence of its energy gap and therefore peak response wavelength. A thermoelectric cooler is one means which can be employed to control the temperature of the detector. If the device is operated at near room temperature no encapsulation of the device is required. If, however, it is operated at low temperatures, a transparent surface covering the incident surface of the device is provided to prevent condensation of moisture upon the incident surface.

The present invention provides for a multicolor photovoltaic device which is formed from a single body of semiconductor alloy material. Thus the signal losses caused by the interface of different materials, as required in the laminated prior art devices are avoided by the present invention. While $Hg_{1-x}Cd_xTe$ has been the specific material discussed, it is obvious to one skilled in the art that other semiconductor alloys exhibiting a compositional gradient, such as lead tin telluride, could be used as well.

The embodiments of the invention in which an exclusive property or right is claimed are defined as follows:

1. An intrinsic semiconductor photovoltaic device having peak response at a plurality of wavelengths, the device comprising:

- a body of first conductivity-type semiconductor alloy material having differences in composition throughout the body, and having an energy gap at any location in the body which is dependent on the composition at the location,
- a plurality of diffused regions of second conductivity type within the body at locations of different composition, forming PN-junctions exhibiting peak photovoltaic response at different wavelengths, and
- means for making electrical contact with the body and with each of the diffused regions.

2. The device of claim 1 wherein the semiconductor alloy material is mercury cadmium telluride.

3. A photodetector system responsive to a plurality of wavelengths, the system comprising:

- an intrinsic semiconductor photovoltaic device having peak response at a plurality of wavelengths, the device comprising:
  - a body of first conductivity-type semiconductor alloy material having differences in composition throughout the body, and having an energy gap at any location in the body which is dependent on the composition at the location,
  - a plurality of diffused regions of second conductivity type within the body at locations of different composition, forming PN-junctions exhibiting peak photovoltaic response at different wavelengths,
  - means for making electrical contact with the body and with each of the diffused regions,
- means for measuring a potential difference between the body and each of the diffused regions.

4. The system of claim 3 wherein the surface of the body in which the diffused regions of second conductivity type are located is positioned to receive incident radiation.

5. The system of claim 4 wherein the means for making electrical contact with the body comprises a common contact located on the surface opposite the surface in which the diffused regions of second conductivity type are located.

6. The system of claim 3 wherein a surface which is essentially normal to the surfaces in which the diffused regions are located is positioned to receive incident radiation.

7. The system of claim 6 wherein the diffused regions are located in one surface of the body and the PN-junction having a peak response at the shortest wavelength is located nearest the surface upon which the radiation is incident.

8. The device of claim 6 wherein the diffused regions are located in opposite surfaces of the device.

9. The system of claim 3 wherein a surface opposite the surface in which the diffused regions are located is positioned to receive incident radiation.

10. The system of claim 9 wherein the distance between the diffused regions, and the distance between the surface upon which the radiation is incident and the PN-junctions formed by the diffused regions are both greater than the minority carrier diffusion length in the body.

11. The system of claim 3 wherein the semiconductor alloy material is mercury cadmium telluride.

12. The system of claim 3 wherein the system further includes means for controlling the temperature of the photovoltaic device.

* * * * *